United States Patent [19]

DeHaan et al.

[11] Patent Number: 5,280,350
[45] Date of Patent: Jan. 18, 1994

[54] METHOD AND APPARATUS FOR PROCESSING A PICTURE SIGNAL TO INCREASE THE NUMBER OF DISPLAYED TELEVISION LINES USING MOTION VECTOR COMPENSATED VALUES

[75] Inventors: Gerard DeHaan; Gerrit F. M. DePoortere, both of Eindhoven, Netherlands

[73] Assignee: U.S. Philips Corporation, New York, N.Y.

[21] Appl. No.: 751,290

[22] Filed: Aug. 29, 1991

[30] Foreign Application Priority Data

Sep. 3, 1990 [EP] European Pat. Off. ........ 90202330.8

[51] Int. Cl.⁵ .............................................. H04N 7/01
[52] U.S. Cl. ..................... 358/140; 358/105; 358/167
[58] Field of Search ............... 358/105, 140, 136, 166, 358/167, 11; H04N 7/01

[56] References Cited

U.S. PATENT DOCUMENTS

| | | | |
|---|---|---|---|
| 4,684,985 | 8/1987 | Nakagaki et al. .................... | 358/140 |
| 4,924,305 | 5/1990 | Nakagawa et al. ............. | 358/140 X |
| 4,989,090 | 1/1991 | Campbell et al. .................... | 358/140 |
| 5,001,563 | 3/1991 | Doyle et al. ........................ | 358/140 |
| 5,021,870 | 6/1991 | Moyoe et al. .................... | 358/140 X |
| 5,036,393 | 7/1991 | Samad et al. ....................... | 358/140 |

FOREIGN PATENT DOCUMENTS 0395271 10/1990 European Pat. Off. .

OTHER PUBLICATIONS

G. de Haan et al., "New Algorithm For Motion Estimation", Proceedings of the Third International Workshop on HDTV, Torino, 1989.

Primary Examiner—Victor R. Kostak
Attorney, Agent, or Firm—Michael E. Marion

[57] ABSTRACT

After a motion compensated interpolation to obtain an additional line between two adjacent lines of a given field (II) from picture information of at least one neighboring field (I, III), the additional line is vertically filtered to remove artifacts caused by motion estimation errors.

6 Claims, 2 Drawing Sheets

METHOD AND APPARATUS FOR PROCESSING A PICTURE SIGNAL TO INCREASE THE NUMBER OF DISPLAYED TELEVISION LINES USING MOTION VECTOR COMPENSATED VALUES

BACKGROUND OF THE INVENTION

The invention relates to a method and an apparatus for processing a picture signal to obtain a picture signal having improved properties, such as being noninterlaced or having a doubled fine number, while still being interlaced.

EP-A 0 361 558 describes a method and an apparatus of this kind. Therein, a median is determined of signals from two adjacent lines in a given field of the picture signal and from one line of a field preceding the given field and lying vertically between the two adjacent lines in the given field. Preferably, a direction of a contour is determined also, to control the apparatus such that it supplies the median if the contour direction is substantially vertical, and that it supplies an average of the signals from the two adjacent lines otherwise. The supplied signal is multiplexed with the signals of the given field to obtain the non-interlaced picture signal or is processed with the signals of the given field to obtain a field of an interlaced picture signal having the doubled line number.

SUMMARY OF THE INVENTION

It is an object of the present invention to provide a method and an apparatus which offer a better picture display quality than the prior art.

For this purpose, a first aspect of the invention provides a method of processing a line- and field-sequentially assembled picture signal, comprising the steps of:
performing a motion compensated interpolation to obtain an additional line between two adjacent lines of a given field from picture information of at least one neighboring field; and
vertically filtering said additional line using at least one of said adjacent lines of said given field.

A second aspect of the invention provides an apparatus for processing a line- and field-sequentially assembled picture signal, comprising:
means for performing a motion compensated interpolation to obtain an additional line between two adjacent lines of a given field from picture information of at least one neighboring field; and
means for vertically filtering said additional line using at least one of said adjacent lines of said given field.

These aspects of the invention are based on the recognition that the quality of the viewed image can be considerably improved by the use of motion compensated values rather than direct values from the interjacent line of the preceding field.

If a motion vector compensated interpolation is considered good enough, the vertical filtering operation can be dispensed with and the non-interlaced or doubled line number output signal can be obtained by a third aspect of the invention which provides an apparatus for processing a line- and field-sequentially picture signal, comprising:
means for performing a motion vector compensated interpolation to obtain additional lines between each time two adjacent lines of a given field from picture information of at least one neighboring field; and
means for combining said additional lines and said adjacent lines to form a field having twice a number of lines of said given field.

These and other (more detailed) aspects of the invention will be described and elucidated with reference to the drawings and examples.

DETAILED DESCRIPTION OF THE PREFERRED EMBODIMENTS OF THE INVENTION

Figure 1:
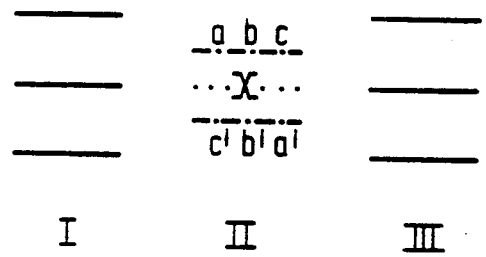
FIG. 1 schematically shows a number of lines from three successive fields of the picture signal.

FIG. 1 schematically shows a number of lines from three successive fields I, II and III. Between two existing lines (indicated by bars and dots) in field 11, a new line (indicated by dots only) is to be interpolated. The present invention provides a new method and apparatus for obtaining the pixel value X on that new line. The method of the invention basically consists of two steps:
1. obtain by motion compensated interpolation an interpolated value from at least the neighboring field I.
2. perform a spatial filtering on the interpolated value to remove artifacts caused by motion estimation errors.

The present invention does not require any specific motion compensated interpolation method; in principle, any method will do. The preferred motion estimator to be used in the motion compensated interpolation has been described in the article "New Algorithm for Motion Estimation", presented by G. de Haan and H. Huijgen at the Third International Workshop on HDTV, Torino 1989. As motion artifacts will be removed by step 2, it is not necessary to use a costly high quality motion compensated interpolation method to obtain high quality results. However, if the motion vector compensated interpolation would yield satisfactory results, the spatial filtering might be dispensed with completely. If artifacts introduced by the spatial filtering are worse than motion vector compensation artifacts, it might even be preferred to omit the spatial filtering. Having regard to the present state of the art in motion vector compensation, it is preferred to perform the spatial postfiltering after the motion vector compensated interpolation.

If the present invention is considered starting from the spatial filtering, the output quality of the spatial filtering is considerably improved by the prior motion compensated interpolation which already provides a reasonable first guess.

If we focus on the spatial postfiltering, a simple implementation would take the median of the pixel value b on the line above the line to be interpolated, the motion compensated interpolated value and the pixel value b' on the line below the line to be interpolated. As set out in U.S. Pat. No. 4,740,842, incorporated herein by reference, it is alteratively possible to determine a contour direction first, by evaluating the pixel value pairs (a, a'), (b, b') and (c, c'). The pair which gives the smallest difference between the two pixel values is called the pair (p, p'); this pair (p, p') is then used in the median filtering instead of the pair (b, b'). However, in a preferred embodiment which follows a teaching of EP-A 0 361 558, incorporated herein by reference, it is first determined whether the pair (p, p') which gives the smallest difference between the two pixel values, corresponds to the vertical direction, i.e. whether (p, p') = (b, b'). If this is true, then the median of the pixel values b, b' and the motion compensated interpolated value is determined, in the other case, the average of the pixel values p and p' is outputted as the interpolation result. In an elaboration of this embodiment, the median is also chosen when there is no clear preference for an oblique direction like e.g. the (a, a') or (c, c') direction, which inter alia may occur when the image shows little contrast or is noisy, or when the contour direction is substantially horizontal. Consequently, the preferred filtering direction might be different from a determined edge direction.

Figure 2:
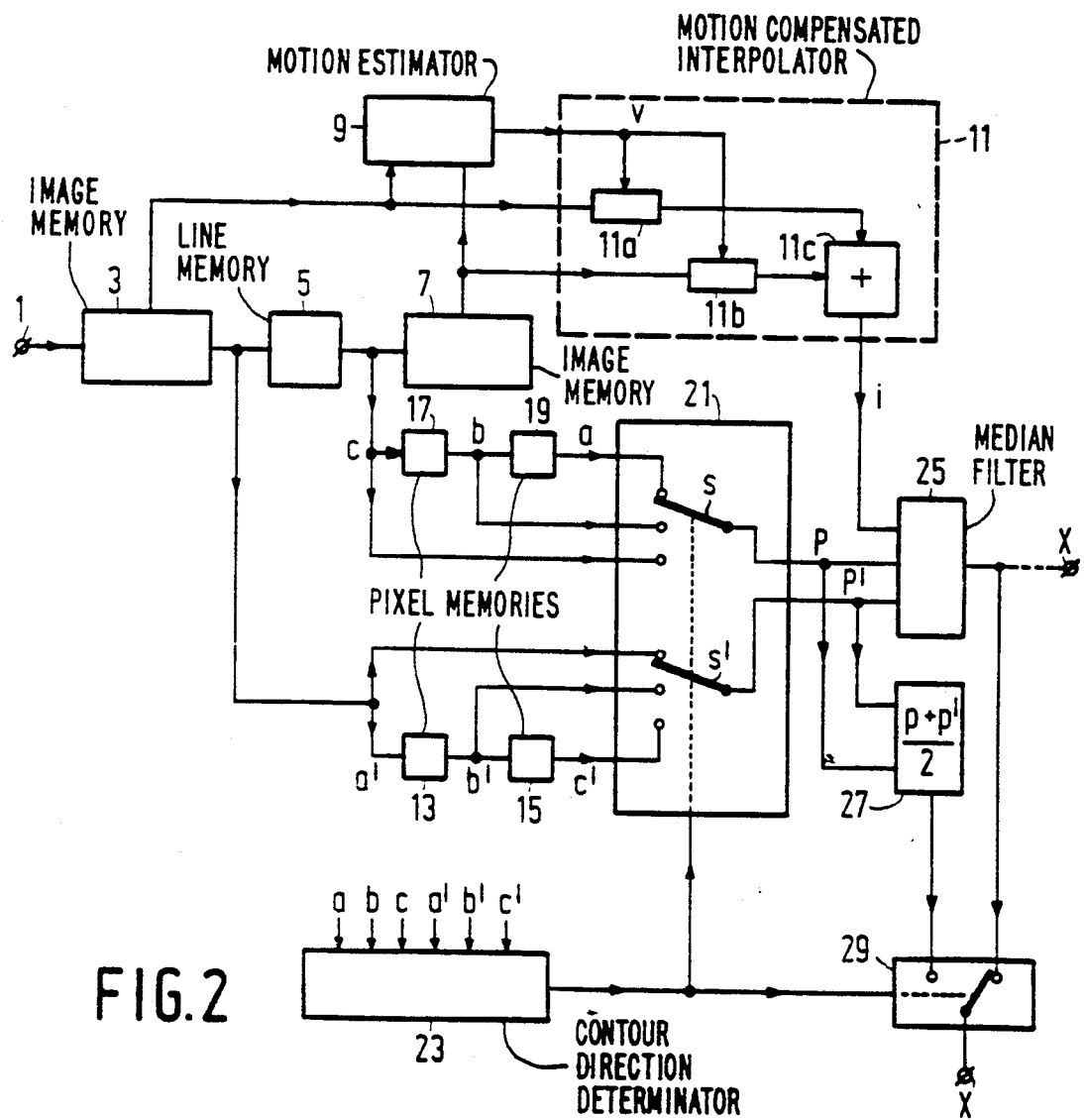
FIG. 2 shows an apparatus according to the invention.

FIG. 2 shows an apparatus which performs this last mentioned, preferred implementation of the invention. An input I is connected to a series arrangement of a first image memory 3, a line memory 5 and a second image memory 7. Information from both image memories 3 and 7 is used in a motion estimator 9 to determine a motion vector v. The motion estimator 9 may be of any known kind. Preferably, estimator 9 is the estimator described in the article "New Algorithm for Motion Estimation" mentioned above. Another possibility would e.g. be a block motion estimator which compares fields II and I to determine which pixels in field I correspond to a given block in field II. It will be appreciated that if the motion is estimated for blocks, motion vectors are obtained which are not only valid for the bar-dot existing lines in field 11, but also for the dotted interjacent lines to be interpolated. The motion vector v and picture information from the image memories 3 and/or 7 are used in a motion compensated interpolator 11 to obtain an interpolated value i.

The motion compensated interpolator II comprises a vector controlled delay 11a which receives the picture information from the first image memory 3, a vector controlled delay 11b which receives picture information from the second image memory 7, and an adder 11c receiving output signals of both vector controlled delays 11a and 11b and supplying the interpolated value i. The vector controlled delays 11a and 11b supply their output signals in dependence on the motion vector v.

It will be appreciated that it is more economic to shift information from one field only rather than to perform a motion compensated averageing operation on information from two fields. However, previously, motion compensated averageing was preferred because the averageing action contributed to a removal of motion artifacts. As according to the present invention the motion compensated interpolation is followed by a vertical filtering to remove motion artifacts, it is no longer necessary to use information from two fields in the motion compensated interpolation, so that the more economic motion compensated shift of information from one field only becomes possible without a loss of image display quality.

If a motion compensated shift from only one field is performed, the vector controlled delay 11a and the adder 11c can be dispensed with; in that case the motion compensated interpolator 11 consists of the vector controlled delay 11b.

An output of the first image memory 3 supplies the pixel value a' and is connected to a series arrangement of two pixel memories 13 and 15 whose outputs supply the pixel values b' and c', respectively. An output of the line memory 5 supplies the pixel value c and is connected to a series arrangement of two pixel memories 17 and 19 whose outputs supply the pixel values b and a, respectively. The pixel values a, b, c and a', b', c' are applied to two switches S and S' of a switching device 21 which is controlled by a contour direction determinator 23 which may be as described in U.S. Pat. No. 4,740,842 or EP-A 0 361 558. Switch S su lies e pixel value p while switch S' supplies the pixel value p'.

The motion compensated interpolated value i and the pixel values p and p' are applied to a median filter 25 which may be as described in U.S. Pat. No. 4,740,842. As shown by an interrupted line, in a simple embodiment of the invention the median filter 25 supplies the output value X. However, as discussed hereinbefore, in a preferred embodiment, the median of the pixel values i, p and p' is only supplied as the output value if the preferred filtering direction determined by the contour direction determinator 23 is the vertical direction. This implies that in this preferred embodiment instead of the pixel values p and p', the pixel values b and b' can be applied to the median filter 25, while there is no need for the pixel values b and b' to be applied to the switching device 21, so that the switches S and S' can become two-state switches instead of three-state switches.

As-described in a copending Application (PHN 13.436), the contour direction may instead of the pixels a', b', c' of a line lying in the same field and adjacent to the line on which the pixels a, b, c are positioned, use pixels from an interjacent line of the preceding field or from the interjacent line shown in FIG. 1 which is calculated by the motion compensated interpolator 11. As this interjacent line is closer to the line on which the pixels a, b, c are positioned, a more accurate contour direction determination is obtained. It will be evident from copending Application (PHN 13.436) that the contour direction determiner may determine more than 3 preferred filtering directions; in that case, switching device 21 and the number of pixel memories should be adapted accordingly.

To determine the average of p and p' which is to be supplied if the preferred filtering direction is oblique, the pixel values p and p' are supplied to an averager 27. The output of the median filter 25 and an output of the averager 27 are supplied to respective inputs of a switch 29. The switch 29 is controlled by the contour direction determiner 23 to supply the median filter output signal if the preferred filtering direction is vertical, and to supply the averager output signal if the preferred filtering direction is oblique, i.e. e.g. along a—a' or c—c'.

The man skilled in the art will appreciate that, as described in EP-A 0 361 558, the switch 29 may be a mixer performing a soft switch.

Figure 3A:
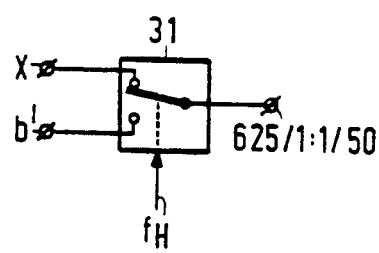
FIG. 3A and 3B show two postprocessors to be added to the apparatus of FIG. 2.

The apparatus shown in FIG. 2 can be used in a picture signal processing circuit constituting an interlaced-to-progressive scanning conversion circuit when, as shown in FIG. 3A, the output of the switch 29 is connected to a first input of a line compression-and-multiplex circuit 31, a second input of which is connected to receive the pixel value b'. The line compression-and-multiplex circuit 31 compresses the line periods of the picture signals applied to the inputs thereof with a factor 2 and then supplies, line-alternatingly, a picture signal supplied by the switch 29 and thereafter compressed, or a compressed input picture signal. A progressively scanned picture signal is then available at an output of the line compression-and-multiplex circuit 31, which result is denoted by 625/1:1/50, wherein 625 indicates the number of lines per picture, 1:1 stands for non-interlaced or progressive scan, and 50 indicates the number of fields. Such a line compression-and-multiplex circuit 31 is known per se and may, for example, be in the form of the cascade arrangement of the elements 223 and 244 in FIG. 3 of U.S. Pat. No. 4,740,842.

In FIG. 3A of the present Application only the multiplex action of the line compression-and-multiplex circuit 31 is symbolized.

Figure 3B:
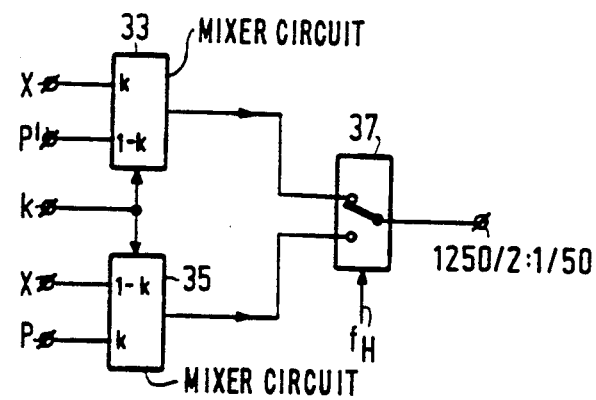

The interpolation filter may alternatively be used in a picture signal processing circuit forming a line number doubling circuit which preserves interlace. To that end, as shown in FIG. 3B, the output of the switch 29 is connected to a first input of a first position-interpolation circuit designed as a mixer circuit 33, to a second input of which the signal from the picture element p' is applied, and to a first input of a second position-interpolation circuit designed as a mixer circuit 35, to a second input of which the signal from the picture element p is applied. Since the signals of the picture elements p' and p are applied to the second inputs of the respective mixer circuits 33 and 35, also the mixing operations performed by these mixer circuits 33 and 35 are contour dependent. Control inputs of the mixer circuits 33 and 35, receive a weighting factor k the value of which, for an appropriate relative positioning of the lines of the output signal, is equal to ¼ during the first field of each picture and equal to ¾ during the second field of each picture. Outputs of the mixer circuits 33 and 35 are connected to respective inputs of a line compression-and-multiplex circuit 37, from an output of which the interlaced output signal can be taken with double the number of lines. This output signal is indicated by 1250/2:1/50. For simplicity reasons, again only the multiplex action of block 37 is symbolized in FIG. 3B.

Figure 4:
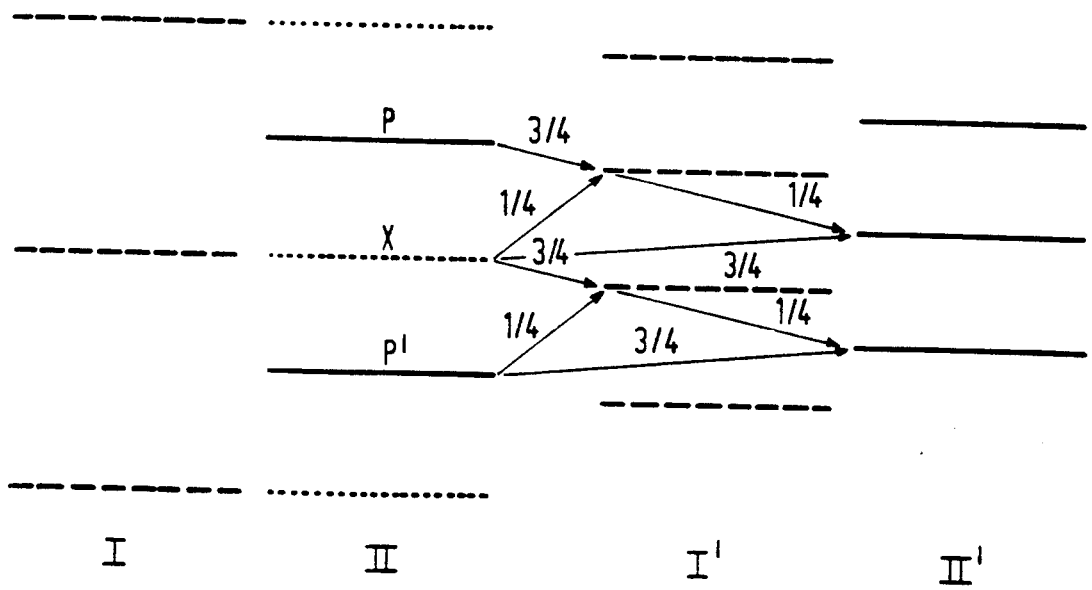
FIG. 4 shows a representation of line number doubling and progressive scan conversion operations.

In FIG. 4 the operation of the interlaced-to-progressive scanning conversion circuit of FIG. 3A and of the line number doubling circuit of FIG. 3B which preserves interlace is illustrated in greater detail. In a left-hand column I broken lines indicate lines of a first interlaced input field and in a left-hand centre column II solid lines indicate lines of a second input field, the lines of the first and second input fields together forming an interlaced 625/2:1/50 input picture signal. In the left-hand centre column III the lines of the output signal X at the output of the switch 29 are represented by dotted lines. If the lines of the second field and the lines of the output signal X are combined by the line compression-and-multiplex circuit 31 as is shown in the left-hand centre column, a picture signal is obtained with a non-interlaced or progressive scanning, denoted 1:1, so that the 625/1:1/50 picture signal is formed.

In a right-hand centre column I' bold broken lines indicate lines of a first output field of the line number doubling circuit of FIG. 3B. The lines of the first and second output fields in the columns I' and II' form together the interlaced 1250/2:1/50 picture signal with double the number of lines. As is indicated by means of arrows, the interlace denoted by 2:1, is obtained in that the weighting factor k of FIG. 1 applied to the control inputs of the respective mixer circuits 33 and 35 changes its value from field to field (k=¼ or k=¾).

After having read this description, a person skilled in the art will be able to design numerous variations. All these variations are considered to be part of the field of the invention. For example, the output signal of the switch 29 can be used for forming an image signal having twice the field number of the input signal.

We claim:

1. A method of processing a line and field sequentially assembled picture signal, comprising the steps of:
   performing a motion compensated interpolation to obtain an additional line between two adjacent lines of a given field from picture information of at least one neighboring field;
   vertically filtering said additional line using at least one of said adjacent lines of said given field, wherein said vertically filtering step includes determining a median of signals from said additional line and from two lines adjacent to said additional line;
   determining a direction of a contour in a picture of said picture signal to obtain a preferred filtering direction;
   obtaining an average of two pixel values on said two adjacent liens in the direction of the contour; and
   supplying said median if said preferred filtering direction is vertical, and supplying said average otherwise.

2. A method of processing a line and field sequentially assembled picture signal, comprising the steps of:
   performing a motion compensated interpolation to obtain an additional line between two adjacent lines of a given field from picture information of at least one neighboring field;
   vertically filtering said additional line using at least one of said adjacent lines of said given field, wherein said additional line and said adjacent lines of said given field are multiplexed to form a non-interlaced picture signal.

3. A method of processing a line and field sequentially assembled picture signal, comprising the steps of:
   performing a motion compensated interpolation to obtain an additional line between two adjacent lines of a given field from picture information of at least one neighboring field;
   vertically filtering said additional lines using at least one of said adjacent lines of said given field, wherein said additional line and said adjacent lines of said given field are processed to form a field of an interlaced picture signal having a doubled line number.

4. Apparatus for processing a line and field sequentially assembled picture signal, comprising:
   means for performing a motion compensated interpolation to obtain an additional line between two adjacent lines of a given field from picture information of at least one neighboring field; and
   means for vertically filtering said additional line using at least one of said adjacent lines of said given field; wherein said vertically filtering means further include:
   means for determining a median of signals from said additional line and from two lines adjacent to said additional line;
   means for determining a direction of a contour in a picture of said picture signal to obtain a preferred filtering direction;
   means for obtaining an average of two pixel values on said two adjacent lines in the direction of said contour; and
   means for supplying said median if said preferred filtering direction is vertical, and supplying said average otherwise.

5. Apparatus for processing a line and field sequentially assembled picture signal, comprising:

means for performing a motion compensated interpolation to obtain an additional line between two adjacent lines of a given field from picture information of at least on neighboring field; and means for vertically filtering said additional line using at least one of said adjacent lines of said given field; wherein said vertically filtering means include means for multiplexing said additional line and said adjacent lines of said given field to form a field of an interlaced picture signal having a doubled line number.

6. Apparatus for processing a line and field sequentially assembled picture signal, comprising:

means for performing a motion compensated interpolation to obtain an additional line between two adjacent lines of a given field from picture information of at least on neighboring field; and means for vertically filtering said additional line using at least one of said adjacent lines of said given field; wherein said vertically filtering means include means for processing said additional line and said adjacent lines of said given field to form a non-interlaced picture signal.

* * * * *